April 11, 1961     J. S. ECKERT     2,979,315
HOLD-DOWN PLATES

Filed Oct. 16, 1958     2 Sheets-Sheet 1

INVENTOR.
JOHN S. ECKERT
BY
*Gordon C. Mark*
ATTORNEY

April 11, 1961   J. S. ECKERT   2,979,315
HOLD-DOWN PLATES

Filed Oct. 16, 1958   2 Sheets-Sheet 2

INVENTOR.
JOHN S. ECKERT
BY
ATTORNEY

United States Patent Office 2,979,315
Patented Apr. 11, 1961

2,979,315

HOLD-DOWN PLATES

John S. Eckert, Silver Lake, Ohio, assignor to The United States Stoneware Company, Tallmadge, Ohio, a corporation of Ohio Filed Oct. 16, 1958, Ser. No. 767,542

1 Claim. (Cl. 261—94)

This invention relates to improvements in hold-down plates for packed towers which are used to effect either mass transfer or heat transfer between gas and liquid phases or between two mutually insoluble liquid phases. As illustrative of such mass transfer, reference is had to solution of material from one phase into the other phase, or removal of dust from a gas by a liquid, etc. Such towers will be referred to herein as packed treatment towers. Generally such towers are cylindrical, but they have a square, hexagonal or any other cross section. They may be constructed of brick, metal or any other suitable material.

They are packed with packing elements of a suitable shape to provide large-area contact between the two phases. These elements may be rings, saddles, etc. They may be composed of a ceramic composition, plastic, metal, etc.

The hold-down plate of this invention is ceramic. Its shape will depend upon the cross-sectional shape of the tower. Usually it will be substantially circular in outline. Preferably several projections extend outwardly from said outline to space the hold-down plate from the wall of the tower in which it is used. Its border is generally solid, either a circle, square, etc. and within said outlining portion is a grid, the cross members of which are any shape forming openings of any shape. Although generally parallel bars will be used, bars of other shapes may be employed, and if desired the grid may be formed of crossed members. The grid is so designed that its solid portion occupies less, and preferably substantially less, than fifty percent of the whole cross-sectional area of the tower.

The invention will be further described in connection with the accompanying drawings, in which—

Figure 1:
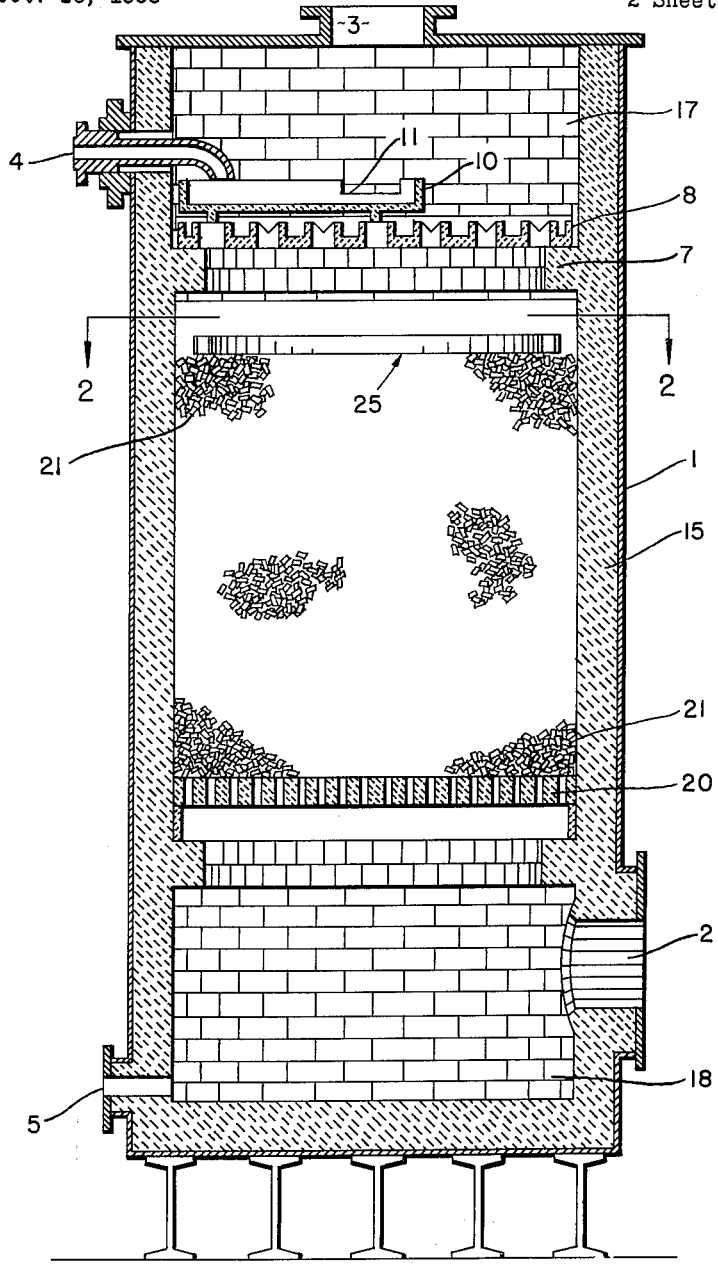
Fig. 1 is a view in section of the tower.
Figure 2:
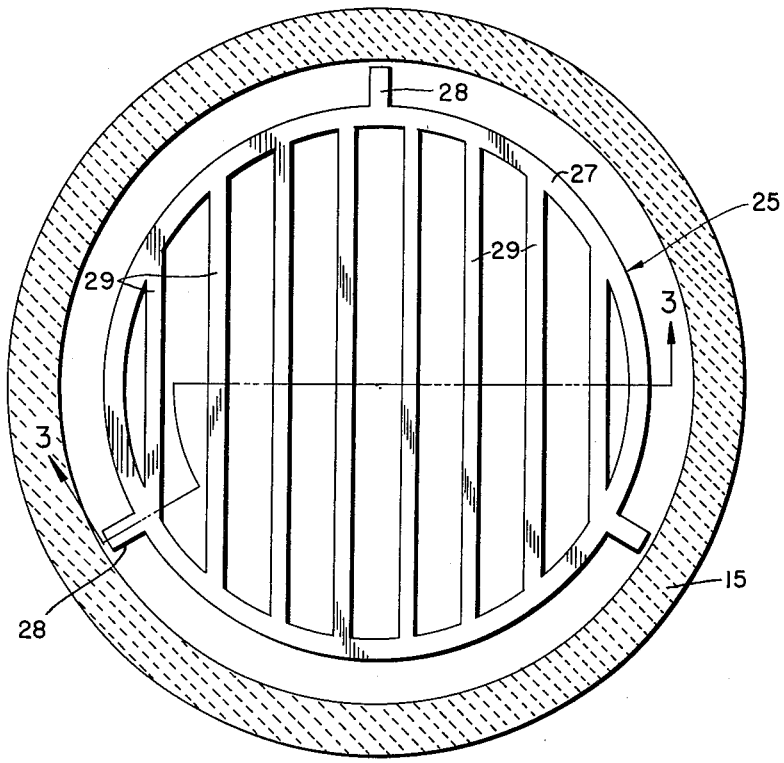
Fig. 2 is a plan view of the hold-down plate within a section of the tower on the line 2—2 of Fig. 1.
Figure 3:
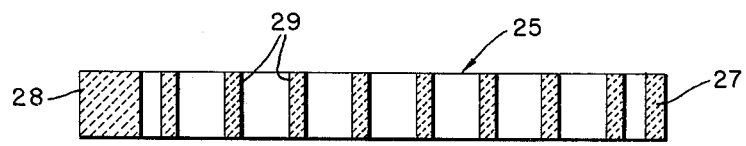
Fig. 3 is a section through the hold-down plate on the line 3—3 of Fig. 2.

The tower shown in Fig. 1 is intended to be illustrative of any packed tower. Usually the shell is steel. All or part of it can be lined with corrosion-resistant brick. The inlets, outlets and distributors are illustrative of the many types that may be employed.

The tower 1 includes the gas inlet 2, the gas outlet 3, the liquid inlet 4 and the liquid outlet 5. It will generally include distributing means supported on a ledge 7 in the tower, such as the weir-type distributor 8 and the cross distributor 10.

The inner surface of the shell, at the top 17 and bottom 18 are protected by resistant tile or brick, but this is illustrative only. The tower is constructed with a suitable perforate support plate 20 on which rest the packing elements 21. The hold-down plate 25 rests on the packing and the elements of its grid are relatively closely spaced to prevent the packing elements under it from floating or being otherwise re-distributed when sufficient liquid accumulates at the surface of the packed bed to cause them to move. Its function is to maintain the bed of the packing elements of constant uniform thickness.

The hold-down plate 25 is composed of an outer ring 27, spacers 28 which project from the ring and space it from the wall, and cross bars 29 which form a grid. The hold-down plate is formed from the ceramic composition in any suitable manner and then fired.

The size of the hold-down plate will depend upon the size of the tower in which it is to be used. It may, for example, be 4 or 6 feet in diameter, more or less. The spacer projections 28 may extend about 3 inches outwardly from its rim, and they may come within ¾ inch of the wall of the tower. If the tower is square in cross-section there are at least two such projections from each side of it. The ring 27 and cross-members 29 may be about 6 inches thick. The cross-members may be ¾ inch to 2 inches wide, and the ring may be somewhat wider. These measurements are illustrative only, and any or all of them may vary quite widely. The total area of the ring 27 and the cross-members 29 is substantially less than 50 percent of the area defined by the outer circumference of the ring.

The invention is covered in the claim which follows.

What I claim is:

In the combination of a packed treatment tower containing a bed of packing elements, and a hold-down plate, the improvement which consists of the hold-down plate being ceramic and in one piece and having a generally circular outer portion with a small plurality of at least three spacer projections, each of the same length, extending a short distance outwardly from said outer portion, and thin, relatively closely spaced, substantially parallel, elongated grid members extending across said circular portion, the area of the solid portion of the plate being less than 50% of the cross-sectional area of the tower, with the hold-down plate resting on the bed, the length of the projections and the distance between the grid members being substantially equal to the smallest dimension of the packing elements whereby upon flooding of the tower the packing elements are prevented from passing through or around the hold-down plate, and whereby the hold-down plate maintains the bed of substantially uniform thickness and prevents the packing elements at the surface of the bed from being re-distributed to any substantial extent when liquid accumulates at the surface of the bed.

References Cited in the file of this patent

UNITED STATES PATENTS

| 556,040 | Alberger | Mar. 10, 1896 |
| 1,654,925 | Drager | Jan. 3, 1928 |
| 1,947,777 | Huff et al. | Feb. 20, 1934 |

FOREIGN PATENTS

| 27,968 | Great Britain | 1903 |
| 335,803 | France | Dec. 16, 1903 |
| 787,273 | France | July 1, 1935 |